United States Patent [19]

Shlatz

[11] 4,285,512
[45] Aug. 25, 1981

[54] DOCUMENT FEED DEVICE
[75] Inventor: Myron F. Shlatz, Boulder, Colo.
[73] Assignee: International Business Machines Corporation, Armonk, N.Y.
[21] Appl. No.: 104,636
[22] Filed: Dec. 17, 1979
[51] Int. Cl.³ .......................... B65H 5/06; B65H 9/16
[52] U.S. Cl. .................................. 271/233; 271/240; 271/251; 271/264; 271/238; 355/3 SH; 355/75
[58] Field of Search ............... 271/264, 245, 246, 233, 271/275, 251, 4, 3.1, 238, 239, 240, 200; 355/75, 35 H, 14 SH

[56] References Cited

U.S. PATENT DOCUMENTS

| | | | |
|---|---|---|---|
| 2,638,343 | 5/1953 | Luehrs | 271/251 X |
| 3,510,125 | 5/1970 | Krueger et al. | 271/233 X |
| 3,829,082 | 8/1974 | Hoyer | 271/4 |
| 3,888,582 | 6/1975 | Griswold | 355/69 |
| 3,949,979 | 4/1976 | Taylor et al. | 271/245 X |
| 3,980,296 | 9/1976 | Craft et al. | 271/251 |
| 3,994,582 | 11/1976 | Goshima et al. | 355/75 |
| 3,997,265 | 12/1976 | Menon et al. | 355/75 |
| 4,043,550 | 8/1977 | Phillips et al. | 271/233 |
| 4,052,054 | 10/1977 | Cardwell et al. | 271/251 X |
| 4,146,326 | 3/1979 | Taylor et al. | 271/246 X |
| 4,203,585 | 5/1980 | Kunz et al. | 271/4 |

Primary Examiner—Bruce H. Stoner, Jr.
Attorney, Agent, or Firm—Charles E. Rohrer

[57] ABSTRACT

A paper feed device to forward documents to be copied across a document glass utilizing foraminous rollers positioned above the glass at a slight angle to the direction of document movement to move the side of the document into sliding relationship with a reference edge during the forwarding operation. The angle is produced by a curved drive shaft and rollers at opposite ends of the drive shaft are at different angles to the direction of paper movement. The rollers and drive train are rigidly mounted on a plate which is nonrigidly carried in a frame which pivots about a hinge at one end of the document glass. The plate rests on the top surface of front and rear reference edges when the frame is closed to assure accurate positioning of the rollers in relation to the document glass. After completing the forward feeding of a document, it is reversed a slight distance to a registration position for the copying operation.

15 Claims, 4 Drawing Figures

DOCUMENT FEED DEVICE

This invention relates to document reproduction machines and more particularly to a document feed device for use in forwarding originals to the copying station.

BACKGROUND OF THE INVENTION

Many document copying machines require that a document be held in a stationary manner face down on a document glass in order to be copied. Frequently, in a copier of this type, it is necessary for the operator to place the document on the document glass manually. However, in some machines, the operator may feed documents onto the document glass by inserting them one at a time into an automatic feeding arrangement. Mechanisms of this type are known as semiautomatic document feeds (SADF). In other machines, the operator may place a stack of documents upon a feed tray from which they are automatically fed. Mechanisms of this second type are known as automatic document feeds (ADF).

Whether a semiautomatic document feed or an automatic document feed is utilized, it is necessary for some mechanisms to move the paper across the document glass and register it accurately thereon for the copying operation. A common type of paper forwarding device is a belt located above the document glass such as described in U.S. Patent Application, Ser. No. 926,979, now U.S. Pat. No. 4,203,585. While belt mechanisms of this type are in general use, they are difficult to adjust so as to provide accurate registration of documents and without accurate registration, information can be lost during the copying process. It has been found that when compliant rollers are used instead of belts as the paper forwarding mechanism, this problem is greatly reduced.

When compliant rollers such as rollers made from foraminous material are used as the document advancing mechanism in a document feed, a problem is presented in that the rollers must be precisely located in the vertical dimension relative to the horizontal document glass in order to perform the operation successfully. In order to obtain precise mounting, the roller drive shafts and bearing blocks must be solidly mounted on a platen cover at a precise distance above the glass. However, when rigid elements of this kind are interposed above the glass, further problems develop such as cracking of the glass when stray objects, such as pens, are inadvertently left on the glass when the rigid cover is closed. Also, since the typical document glass cover is hinged to pivot between open and closed positions, and may be subject to rough use by a variety of operators, the pivoting action of the cover can create accumulative stresses on the frame so that preciseness in mounting the rollers is lost after a period of use. This invention provides an answer to these problems.

When using a series of rollers to move paper across the document glass, complex drive problems result which may be accentuated by the need to position rollers at an angle to the drive direction in order to move the paper into a reference edge for proper positioning. This problem becomes even more severe when two documents are fed simultaneously onto the document glass with one document being positioned along a front reference edge and the second document positioned along a rear reference edge so that the two documents can be copied simultaneously such as described in U.S. Pat. No. 4,052,054. This problem is made more severe when large documents are to be copied and come under the influence of some rollers tending to position it along the front reference edge and others tending to position it along the rear reference edge. This invention not only provides a simple drive for a series of rollers, it meets these positioning problems as well.

In the machine described in the aforementioned U.S. Patent Application, now allowed, the paper is registered against a positioning gate. At the conclusion of a copying process, when the gate is withdrawn so that the paper may be automatically expelled from the document glass, there is a tendency for paper to catch in the fingers of the gate as they retract; this is especially true of very lightweight paper. It is therefore, an object of this invention to position paper so as to prevent jams in the positioning gate.

SUMMARY OF THE INVENTION

In the instant invention, a rigid platen cover including a metal plate, is precisely positioned to rest in a nonrigid manner above the front and rear reference edges of the document glass. The rigid plate carries paper forwarding means which is preferably an assembly of foraminous rollers and their drives which are positioned in precise relation to the surface of the document glass through their mount on the precisely located plate. Since the plate is made to float in a nonrigid manner on the front and rear reference edges, when stray objects are left on the document glass and the platen cover is closed onto the stray object, the plate may move upwardly without incurring device breakage, at least within the dimensions of floating movement.

Through the use of roller drive shafts with a precise curvature, the rollers may be positioned at an angle to the direction of paper movement in order to position the paper against the front and rear reference edges. In that manner, when two originals are fed simultaneously across the document glass, one may be positioned against the front reference edge while the second is positioned against the rear reference edge. When a large document is fed onto the document glass such that it is under the influence of those rollers tending to move documents into the front reference edge and also under the influence of those rollers tending to move documents into the rear reference edge, the large document is moved to a selected one of the two reference edges by positioning one set of rollers at a greater angle to the direction of paper movement than the other. This is accomplished by variation in shaft curvature.

A DC motor is mounted on the floating plate and is used to drive the foraminous rollers to move the paper across the document glass to the positioning gate. In order that paper not be caught within the fingers of the gate when it is withdrawn at the conclusion of a copying operation, the DC motor is reversed in direction in order to move the paper slightly away from the positioning gate to a registration position for the copying operation. Accuracy in positioning the paper to the registration position is maintained through use of a one-way clutch in conjunction with the DC motor.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
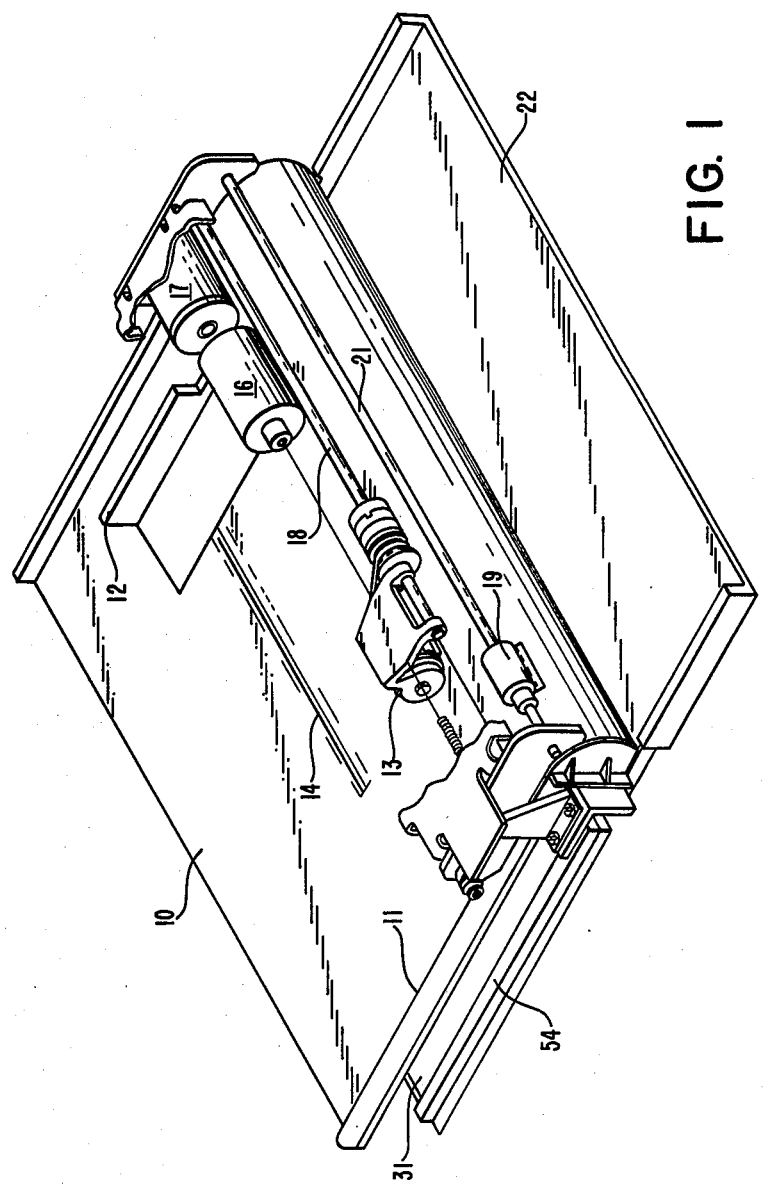
FIG. 1 is a perspective view showing some of the components of a semiautomatic document feed and an automatic document feed positioned relative to a document glass in a copying machine. The floating plate assembly has been removed.

FIG. 1 is a perspective view of an ADF mechanism and an SADF tray through which an operator can move documents onto the document glass of a copying machine. In using the ADF mechanism, the operator places a stack of documents onto ADF tray 10 against the guide edge 11 and moves this stack into the ADF device under the wave generator wheel 13 to a gate 15 shown in FIG. 2. A movable edge guide 12 may then be moved in track 14 to abut the edge of the document stack opposite to the guide 11.

FIG. 1 shows a solenoid 16 for lowering the wave generator wheel 13 onto the topmost sheet of the document stack. A motor 17 drives the wave generator wheel 13 through a shaft 18 and a transmission, not shown. Motor 17 also drives nip roller 19 through shaft 21. Document glass 31 which is on the top surface of a copier machine is also shown in FIG. 1 together with front reference edge 54. The floating plate assembly has been removed since it is located under tray 10 and would be hidden from view except for rollers along reference edge 54.

Figure 2:
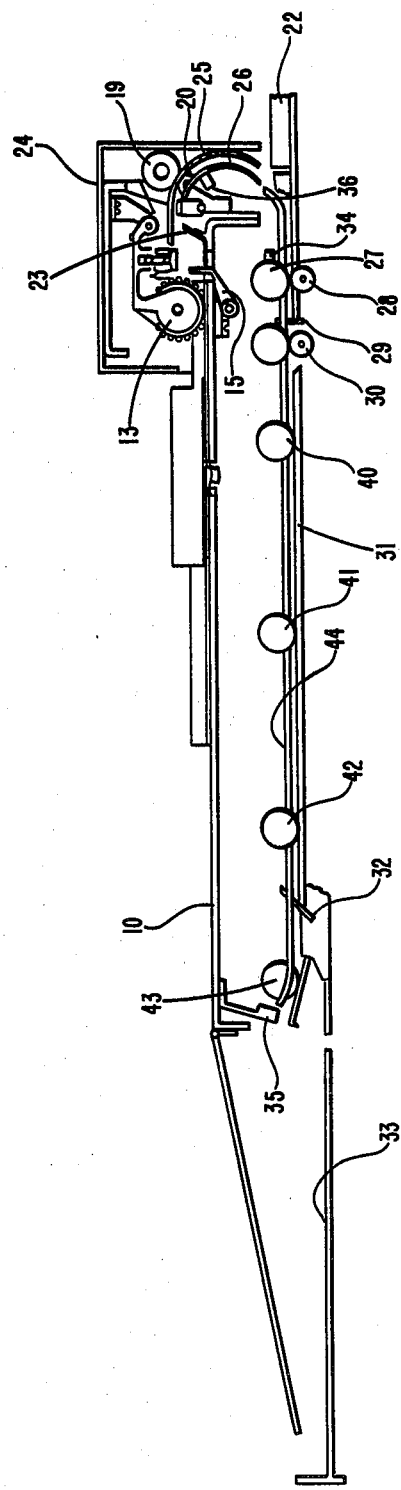
FIG. 2 shows a profile view of the document feeding mechanisms showing the foraminous rollers in relation to the document glass.

FIG. 2 shows a side view of the paper path of the ADF and SADF mechanisms. ADF paper tray 10 is shown with the wave generator wheel 13 in a position to contact a sheet of paper placed upon the tray 10. In order to place a stack of sheets onto tray 10, wave generator wheel 13 is raised through spring action available by de-energizing solenoid 16 as shown in FIG. 1 thus allowing the paper stack to be inserted under wheel 13 against gate 15. Once the paper has been positioned properly, the ADF gate 15 may be lowered. Thereupon, the wave generator wheel 13 is lowered and the topmost sheets of the stack are shingled off of the stack up the ramp 23, across the opening between paper guide 25 and restraint pad 24, into the nip of closed rollers 19 and 20. Once the topmost sheet is within the nip of rollers 19 and 20, it is moved around a 180-degree bend formed by paper guides 25 and 26 and into the nip of aligning rollers 27 and 28. From there the paper passes over a retracted entry gate 29 into the influence of pinch rollers 30. These rollers move the paper onto document glass 31 where motion across the glass is continued by a succession of foraminous rollers 40, 41 and 42. These rollers ultimately move the paper against the positioning gate 32 and then by reversing rollers 40, 41 and 42 the paper is moved a slight distance away from positioning gate 32 to a registration position. After a copy has been made, positioning gate 32 is retracted and rollers 40, 41 and 42 move the copy paper to the exit tray 33 with the assistance of foraminous rollers 43.

FIG. 2 also shows SADF tray 22 which the operator may utilize to pass one sheet of paper into aligning rollers 27 and 28 against the raised entry gate 29. At the proper time, entry gate 29 retracts and the document is fed by rollers 27 and 28, pinch rolls 30 and foraminous rollers 40, 41 and 42 across the document glass 31 to the positioning gate 32. The document is backed away from gate 32 for the copying operation and at its conclusion exit gate 32 is retracted and the document is fed by the foraminous rollers onto exit tray 33.

The operation of the device is as follows: When feeding a single sheet by utilizing the SADF, the operator places a single document face down onto SADF tray 22. The operator pushes the document forward into the area of aligning rolls 27 and 28, entry sensor 34 registers the presence of the document and turns on aligning rolls 27 and 28 which are preferably driven by their own separate motor. The aligner rollers are driven for sufficient time period to enable the document to be registered against the entry gate 29. After registration, the entry gate 29 is lowered through the use of a solenoid, not shown, and the aligner rolls 27 and 28, the pinch rolls 30 and the foraminous rolls 40–43 are started. The document is then fed by these rollers from the entry tray 22 across the document glass platen 31. The aligner rolls are stopped and the entry gate 29 is reset by a trailing edge signal generated as the document leaves the entry sensor 34. Meanwhile, the foraminous rollers continue running for sufficient time to feed the document to the positioning gate 32, whereupon the rolls 40–43 are reversed to back the document to a registration position, R, shown schematically in FIG. 4.

Either after the document has been imaged or during the copying process, gate 32 is dropped by a solenoid, not shown. After imaging is complete, the foraminous rollers 40–43 are restarted to feed the document into the exit tray area 33.

When the automatic document feed is being utilized, the operator places a stack of documents face up onto the tray 10 and pushes the stack against the gate 15 which activates an ADF switch, not shown. Feeding of the documents is initiated when the operator presses the machine start button. Since the ADF switch has been activated, machine logic is enabled to discriminate between ADF operating mode and manual mode and thus the need for special ADF mode start button is eliminated.

Upon actuation, the ADF gate 15 is dropped through solenoid action and ADF motor 17 is turned on. This motor drives both the wave generator wheel 13 and the nip rollers 19 and 20. Shingler solenoid 16 is energized to cause wave generator wheel 13 to drop onto the paper stack and feed the top sheet of the stack into the nip of rollers 19 and 20. Nip sensor 36 is located at the nip and when paper is sensed, dynamic braking is applied to the motor 17 thus stopping the motor quickly. Thereupon, wave generator wheel 13 is lifted from the document stack by de-energizing solenoid 16 and motor 17 is restarted together with the aligner roll motor. The entry gate and exit gates drop and the motor driving the foraminous rollers is also started. The exit gate 32 is restored after a short preset time interval after enabling any document inadvertently left on platen 31 to exit the platen. Motor 17 drives nip rollers 19 and 20 to feed the top document around turnaround guides 25 and 26 to the aligner rolls 27 and 28. As the document leading edge makes the entry sensor 34, a timer is set to stop the foraminous roll motor after a time delay just long enough to allow the document to have reached the positioning exit gate 32 whereupon the foraminous roll motor is reversed to back the document a slight distance away from gate 32 to a registration position R shown schematically in FIG. 4. When the document trailing edge moves past nip sensor 36 the wave generator wheel 13 is dropped onto the paper stack to feed the next document into the nip rollers 19 and 20, thereupon making the nip sensor 36 and dynamically braking motor 17. When the document trailing edge drops the entry sensor 34, the aligner rolls 27 and 28 are stopped and the entry gate 29 is restored.

After the document is copied, the exit gate 32 is dropped and the roller drive is restarted to move the document from the platen 31. As the document leading edge reaches the exit sensor 35, the ADF motor 17 and the aligner roll motor are started. The entry gate 29 is dropped and the second document begins feeding around the turnaround guides 25 and 26 to repeat the cycle. The exit gate 32 is closed after a preset time interval and the foraminous rolls are run for a sufficient time to stop the second document on platen 31.

The above-mentioned steps continue to repeat until the last document in the stack has been copied and exited. Control circuits which may be used to perform these operations are described in the aforementioned U.S. patent application which is incorporated herein by reference.

Figure 3:
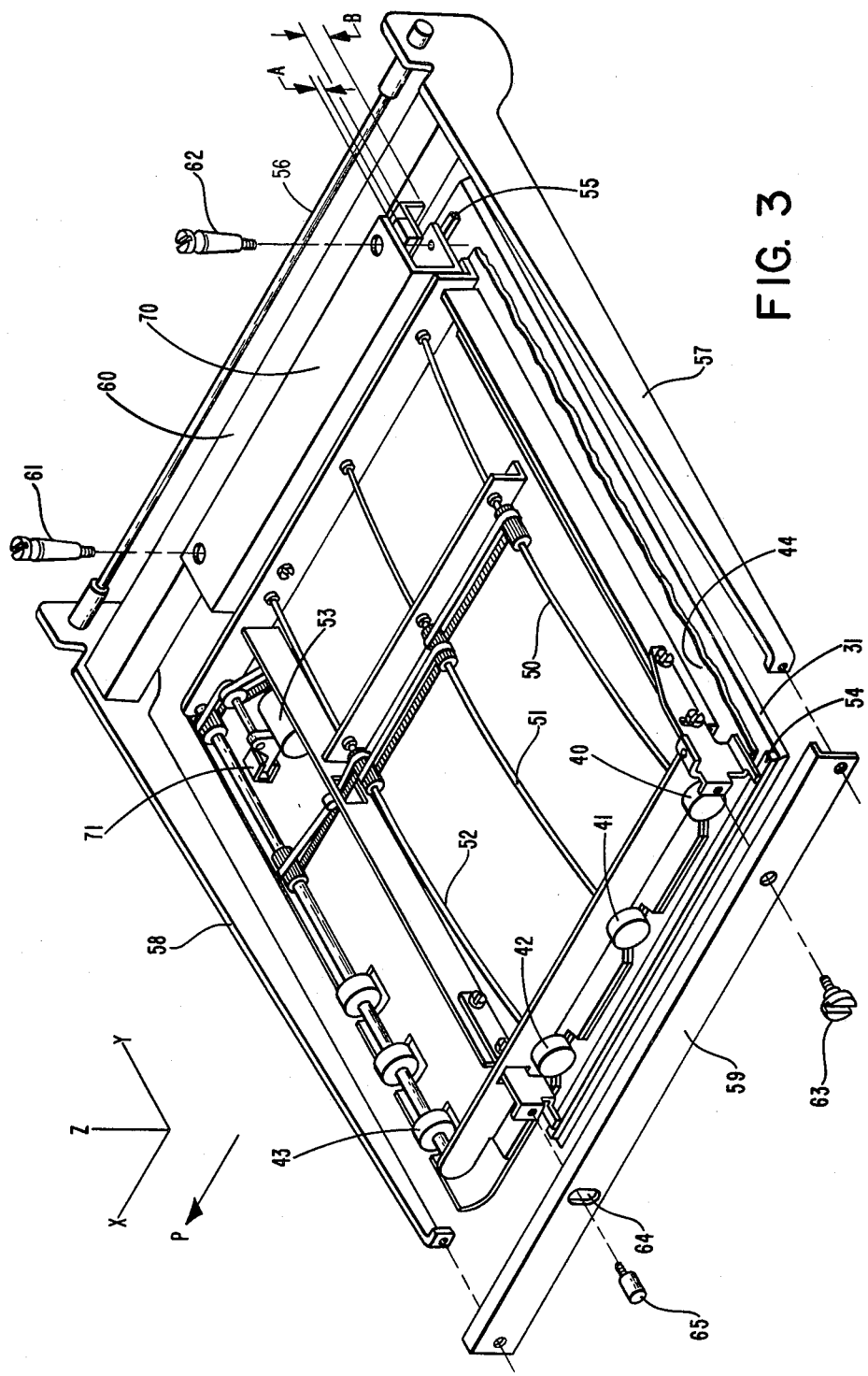
FIG. 3 is a perspective view showing the floating plate upon which the foraminous rollers are mounted.

FIG. 3 is a view in perspective of the floating plate assembly which feeds paper across the glass platen 31. In comparing FIG. 1 and FIG. 3, the mechanism of FIG. 3 was removed from FIG. 1 in order that the glass platen 31 could be clearly shown therein. In FIG. 3, the ADF superstructure of FIG. 1 is removed together with the SADF tray 22 so that the floating plate assembly can be clearly shown.

In FIG. 3, the foraminous rollers 40, 41, 42 and 43 are shown mounted on plate 44 which covers the document platen 31. Bent shafts 50, 51 and 52 provide motion to the foraminous rollers through a drive train originating at motor 53. Front reference edge 54 and rear reference edge 55 are shown mounted on the glass platen 31. A hinge and counterbalancing mechanism, torsion bar 56, is shown at the rear of the assembly. The hinge connects the paper feed device to the copier machine. Arm members 57, 58, 59 and 60 provide a rectangular frame which rotates around the torsion member 56 from an open to a closed position. This frame supports the ADF mechanism shown in FIG. 1. The plate 44 upon which the foraminous rollers are mounted together with the drive mechanisms for those rollers floats within the rectangular frame in a manner now to be described.

The plate assembly is fitted into the frame in the following manner: The plate 44 is made such that it is torsionally flexible about the Y axis through the center of the plate assembly. This flexibility allows the plate assembly 44 to rest on top of the front and rear reference edges 54 and 55 at each corner of the plate assembly. This is achieved with locating pins 61 and 62 which fasten into adjustable nut plates which are hidden by bracket 70. These nut plates attach to the frame and thereby locate the pins 61 and 62. Adjustment of these nut plates allows the feed plate to be positioned accurately to the glass reference edges in the X and Y directions.

Since the top surface of the front and rear reference edges define an exact dimension above the document glass 31, resting the floating plate assembly on these edges results in a precisely defined clearance between the glass 31 and the lower surface of the feed plate 44. This clearance provides for the reception of documents and precisely positioning the foraminous rollers relative to the document glass in the Z axis.

As mentioned above, the feed plate assembly is allowed to float within the rectangular frame which carries it and is thereby isolated from frame stress caused by the pivoting hinge system which must also counterbalance the weight of the ADF mechanisms carried by the frame. Floating is accomplished since only shoulder screw 63 rigidly attaches the plate assembly 44 to the frame. With screw 63 tightened in place, when the frame assembly is lifted to pivot around member 56, the front left corner of plate 44 sags downwardly in the Z axis because of its weight and the weight of the roller drive which it carries. The amount of movement is limited by slot 64 and pin 65 which fits through the slot to fasten to the plate assembly. This movement protects the glass to plate relationship against frame abuse. Also note that when the frame is lifted, the rear portion of plate 44 stays on the surface of the rear reference edge 55 until the rear frame member 60 has moved upwardly a distance A in the Z axis.

A further degree of protection to the relationship between the document glass 31 and the plate assembly 44 is incorporated for the following situation. Suppose that an operator inadvertently leaves an object such as a pencil or a pen on the rear portion of document glass 31 prior to closing the frame assembly. In such a situation, when the operator closes the frame and the object is close to the hinge, torsion bar 56, the operator may not feel the object owing to the "nutcracker" situation involved. The result could be a cracked document glass or a damaged frame assembly. Objects left at the front of the glass would not as likely cause damage owing to the fact that there is much less mechanical advantage under those circumstances. To guard against the situation where something is left near the rear reference edge, the rear portion of plate 44 floats upwardly a maximum amount B as shown in FIG. 3. This is accomplished by connecting plate assembly 44 to the rear frame member 60 by pins 61 and 63, or alternatively by slots identical to slot 64 and pin 65 shown at the left of front member 59 as viewed in FIG. 3. Thus, the plate 44 floats on both the left and right sides of the frame at the rear of the machine and is able to float upwardly a distance B as described above. Plate 44 floats at the left front of the machine and is solidly attached at only the right front by shoulder screw 63.

Foraminous rollers 40, 41 and 42 are positioned at an angle to the paper feed direction by locating the rollers at the ends of curved shafts 50, 51 and 52. The paper feed direction is illustrated by arrow P which lies parallel to the X axis. The degree of inclination of the foraminous rollers to the direction P is a matter of choice but rollers 40, 41 and 42 may be set at 5 degrees in order to move a piece of paper toward the front registration edge 54.

Figure 4:
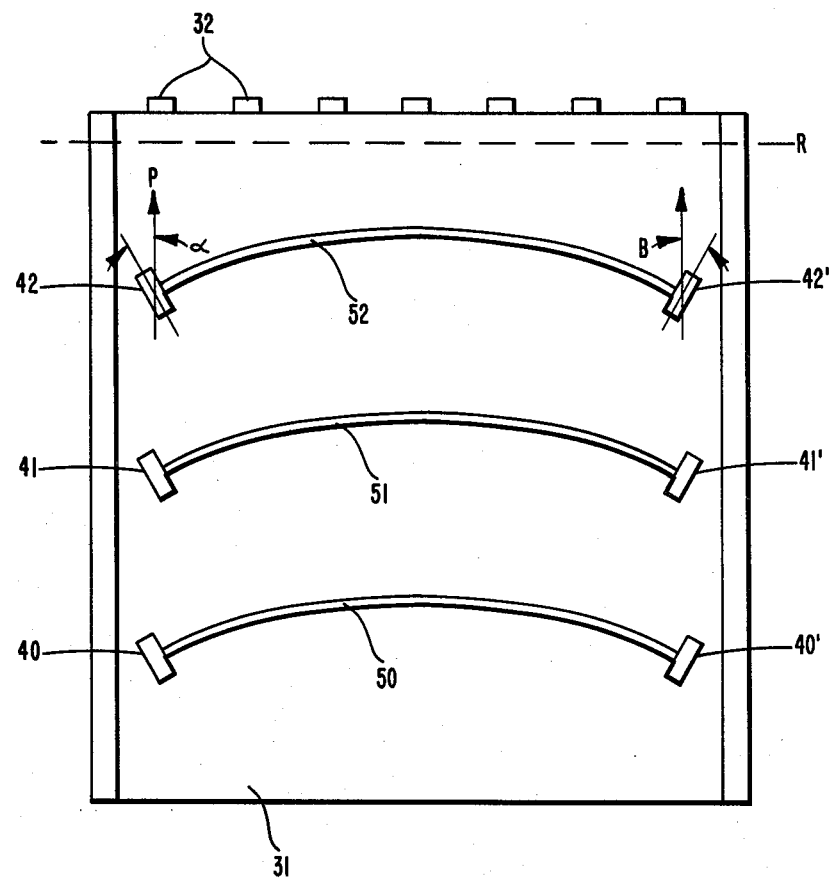
FIG. 4 is a schematic diagram of front and rear rollers.

In a similar manner, foraminous rollers near the rear reference edge 55 (these rollers are hidden from view by bracket 70 in FIG. 3, but are shown in FIG. 4, rollers 40', 41' and 42') are also inclined to the feed direction so that they act to move paper into the rear reference edge 55. The rear foraminous rollers may be positioned at a lesser angle to the direction of paper feed P than the front rollers to ensure the positioning of a large single original document to the front reference edge, even though it might be wide enough to be acted upon by both front and rear rollers during its passage across document glass 31 to the positioning gate 32. Therefore, if the angle α of the front rollers is 5 degrees, the rear rollers may be positioned at an angle β of 3 degrees to accomplish front edge referencing. In this manner, a very simple drive involving curved shafts is provided to solve an accumulation of problems.

As previously mentioned, the documents to be copied are moved to positioning gate 32 and then backed away slightly from that gate to registration position R by operating motor 53 in reverse. To ensure an exact distance for the backup operation, a one-way clutch 71 has been provided. Clutch 71 has no effect on forward motion and allows only a small motion in the reverse direction before it declutches the drive from the motor 53.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A paper feed device for use with a document copying machine for moving documents to be copied across a horizontal document glass comprising:
    paper forwarding means positioned above said horizontal document glass and in relationship thereto for moving said documents across said glass;
    drive means including drive shafts for propelling said paper forwarding means;
    mounting plate means upon which said drive means and said paper forwarding means are mounted;
    stationary reference means for positioning said mounting means above said document glass to achieve the relationship desired in a vertical plane between said paper forwarding means and said glass; and
    frame means for carrying said mounting means slidably fastened thereto to allow said mounting means to float in a vertical plane relative to said frame means.

2. The paper feed device of claim 1 wherein said frame means is connected to a hinge device to allow pivoting movement of said frame means from an open position to a closed position over said document glass, wherein, in said closed position, said mounting means is allowed to float in a vertical plane within a slot in said frame means to settle upon said reference means.

3. The paper feed device of claim 2 wherein said mounting means is slidably fastened to said frame means along the edge of said mounting means closest to said hinge device to enable said mounting means to float within said frame means in a vertical plane.

4. The paper feed device of claim 3 wherein said drive means includes a motor mounted on said mounting means.

5. The paper feed device of claim 4 wherein said paper forwarding means is comprised of compliant roller means to move a document across said document glass to a position at which said document can be copied.

6. The paper feed device of claim 5 wherein said drive shafts are curved in order to position said roller means at an angle to the paper feed direction to move said document against a reference edge positioned parallel to said direction of paper feed to properly position said document for copying.

7. The paper feed device of claim 6 wherein said roller means comprises rollers positioned at opposite ends of said curved shaft so that the roller at a first end of said curved shaft is positioned at a first angle to the paper feed direction so as to move a first document against a first reference edge positioned parallel to the direction of paper feed while the roller at a second end of said curved shaft is positioned at a second angle to the paper feed direction so as to move a second document against a second reference edge positioned parallel to the direction of the paper feed.

8. The paper feed device of claim 7 wherein said second angle is more acute than said first angle so that a single large document under the influence of both first and second rollers is positioned against said first reference edge.

9. The paper feed device of claim 8 wherein said document is moved to a stationary position for the copying operation and wherein said roller means first moves said document in the direction of paper feed and then in a reverse direction to a registration position for the commencement of the copying operation.

10. The paper feed device of claim 1 wherein said paper forwarding means is comprised of compliant roller means to move said document across said document glass to a position at which said document can be copied.

11. The paper feed device of claim 10 wherein said drive shafts are curved in order to position said roller means at an angle to the paper feed direction to move said document against a reference edge positioned parallel to said direction of paper feed to properly position said document for copying.

12. The paper feed device of claim 11 wherein said roller means comprises rollers positioned at opposite ends of said curved shaft so that the roller at a first end of said curved shaft is positioned at a first angle to the paper feed direction so as to move a first document against a first reference edge positioned parallel to the direction of paper feed while the roller at a second end of said curved shaft is positioned at a second angle to the paper feed direction so as to move a second document against a second reference edge positioned parallel to the direction of the paper feed.

13. The paper feed device of claim 12 wherein said second angle is more acute than said first angle so that a single large document under the influence of both first and second rollers is positioned against said first reference edge.

14. The paper feed device of claim 13 wherein said document is moved to a stationary position for the copying operation and wherein said roller means first moves said document in the direction of paper feed and then in a reverse direction to a registration position for the commencement of the copying operation.

15. The paper feed device of claim 10 wherein said document is moved to a stationary position for the copying operation and wherein said roller means first moves said document in the direction of paper feed and then in a reverse direction to a registration position for the commencement of the copying operation.

* * * * *

UNITED STATES PATENT AND TRADEMARK OFFICE
CERTIFICATE OF CORRECTION

PATENT NO. : 4,285,512

DATED : August 25, 1981

INVENTOR(S) : Christopher Hawley et al.

It is certified that error appears in the above—identified patent and that said Letters Patent is hereby corrected as shown below:

On the title page Item (75) Inventors should read:

-- Christopher Hawley, Longmont, George F. Hayes, Niwot, Robert E. Konkle, Longmont, Myron F. Shlatz, Boulder, Colo. --.

Signed and Sealed this

Nineteenth Day of January 1982

[SEAL]

Attest:

GERALD J. MOSSINGHOFF

Attesting Officer

Commissioner of Patents and Trademarks